United States Patent [19]
Cottevieille et al.

[11] Patent Number: 5,658,355
[45] Date of Patent: Aug. 19, 1997

[54] METHOD OF MANUFACTURING A SUPERCAPACITOR ELECTRODE

[75] Inventors: Denis Cottevieille, Montreuil; Xavier Andrieu, Bretigny sur Orge; Frédéric Cariou, Chilly-Mazarin, all of France

[73] Assignee: Alcatel Alsthom Compagnie Generale d'Electricite, Paris Cedex, France

[21] Appl. No.: 450,139

[22] Filed: May 26, 1995

[30] Foreign Application Priority Data

May 30, 1994 [FR] France ................................ 94 06532

[51] Int. Cl.$^6$ ........................................... H01G 9/15
[52] U.S. Cl. ............................................... 29/25.03
[58] Field of Search .......................... 29/25.03; 361/502, 361/508

[56] References Cited

U.S. PATENT DOCUMENTS

| | | | |
|---|---|---|---|
| 5,079,674 | 1/1992 | Malaspine | 29/25.03 |
| 5,442,197 | 8/1995 | Andrieu et al. | 29/25.03 |

FOREIGN PATENT DOCUMENTS

| | | |
|---|---|---|
| 0449145A2 | 10/1991 | European Pat. Off. . |
| WO9211649 | 7/1992 | WIPO . |

*Primary Examiner*—John Niebling
*Assistant Examiner*—Thomas G. Bilodeau
*Attorney, Agent, or Firm*—Sughrue, Mion, Zinn, Macpeak & Seas

[57] ABSTRACT

A method of manufacturing a supercapacitor electrode containing a metal oxide and carbon-containing material, the method including the following steps: starting from a salt of said metal dissolved in an aqueous solution of a strong base, the hydroxide of the metal is precipitated in the form of a gel by adding an alcohol; the precipitate of the hydroxide of the metal is washed and dried; active carbon is added to the precipitated hydroxide of the metal to consitute a first mixture; the first mixture is subject to heat treatment in order to transform the hydroxide into an oxide, and a mixture of metal oxide and of active carbon is obtained which constitutes the active material of the electrode; and a binder is added to the active material to form a paste which is put into the form of an electrode.

9 Claims, 1 Drawing Sheet

METHOD OF MANUFACTURING A SUPERCAPACITOR ELECTRODE

The present invention relates to a method of manufacturing an electrode for use in supercapacitors. It also extends to an electrode manufactured by the method.

BACKGROUND OF THE INVENTION

The most widely used supercapacitors have electrodes made either of active carbon or else of a metal oxide deposited on a collector.

The metal oxides generally used are oxides of ruthenium or of iridium. These oxides are obtained by thermally decomposing chlorides under oxidizing conditions at temperatures of about 350° C. to 400° C., as described in South African patent No. 662 667. The methods usually used for preparing them give rise to a compound that is not very porous. Practical capacitance densities as measured on such electrodes are less than 100 Farads per gram of active mass.

Practical capacitance densities of about 150 Farads per gram of active mass have been obtained using electrodes made of active carbon. However work on such materials leaves no room for significant progress.

OBJECTS AND SUMMARY OF THE INVENTION

An object of the present invention is to provide a method of manufacturing a supercapacitor electrode having capacitance density that is considerably greater than that of known electrodes.

To this end, the invention provides a method of manufacturing a supercapacitor electrode containing a metal oxide and carbon-containing material, the method including the following steps:

starting from a salt of said metal dissolved in an aqueous solution of a strong base, the hydroxide of said metal is precipitated in the form of a gel by adding an alcohol;

said precipitate of the hydroxide of said metal is washed and dried;

active carbon is added to said precipitated hydroxide of said metal to constitute a first mixture;

said first mixture is subjected to heat treatment in order to transform the hydroxide into an oxide, and a mixture of metal oxide and of active carbon is obtained which constitutes the active material of the electrode; and a binder is added to said active material to form a paste which is put into the form of an electrode.

The method of the present invention includes a first step that relies on the principle of sol-gel precipitation of a metal hydroxide. The hydroxide is precipitated from a solution of a salt of the chosen metal at a concentration lying in the range 1 gram per liter (g/l) to 30 g/l in a strong base which may be NaOH or KOH, for example, and excluding $NH_4OH$ in order to avoid complexing reactions.

The said metal is preferably selected from ruthenium, iridium, tungsten, molybdenum, cobalt, chromium, manganese, nickel, and mixtures thereof. These metals have the advantage of presenting a plurality of oxidation states of non-stoichiometric composition. The domain within which such oxides exist corresponds to the domain within which capacitive behavior is observed.

Also preferably, said metal salt is selected from a salt of a strong acid, such as a chloride, a sulfate, or a nitrate, and a salt of oxalic acid.

The hydroxide is made insoluble by adding an alcohol to the solution. A very fine precipitate of metal hydroxide is then formed (particle size less than 1 μm) and remains in suspension in the solution. Said alcohol is preferably selected from ethanol, methanol, isopropanol, butanol, and mixtures thereof.

The precipitate is then washed in order to remove the salt anion. Washing is performed by alternating dispersion and centrifuging, and the precipitate is then dried in a vacuum.

Thereafter, the precipitated metal hydroxide is intimately mixed with active carbon of large specific surface area, e.g. by being put into suspension in a liquid medium. Advantageously, the active carbon has a specific surface area greater than 1000 square meters per gram ($m^2/g$). The advantage of making this mixture is to keep the precipitate in dispersed form since it would otherwise tend to clump together because of its small grain size.

The hydroxide is transformed into oxide by removing a water molecule by performing heat treatment. Said heat treatment is preferably preformed at a temperature lying in the range 200° C. to 300° C. so as to avoid degrading the active carbon. The heat treatment may be performed in an inert atmosphere. An intimate mixture of metal oxide and of active carbon is thus obtained, constituting active material for an electrode, and a binder is added thereto.

The reactions involved in the method of the invention are as follows, were M is the metal and A is the salt anion:

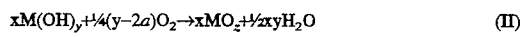

The method of the present invention has the advantage of providing an active material that has very large specific surface area because of its high degree of dispersion. This characteristic is associated with the conditions under which the hydroxide is precipitated and with the precipitate being dispersed in a microporous matrix. By mixing the hydroxide and the active carbon together prior to applying heat treatment, it is possible to obtain better cohesion between the ingredients of the active material of the electrode.

BRIEF DESCRIPTION OF THE DRAWING

Other characteristics and advantages of the present invention appear on reading the following examples of embodiments, which are naturally given as non-limiting illustrations, and also with reference to the accompanying drawing, in which.

MORE DETAILED DESCRIPTION

Figure 1:
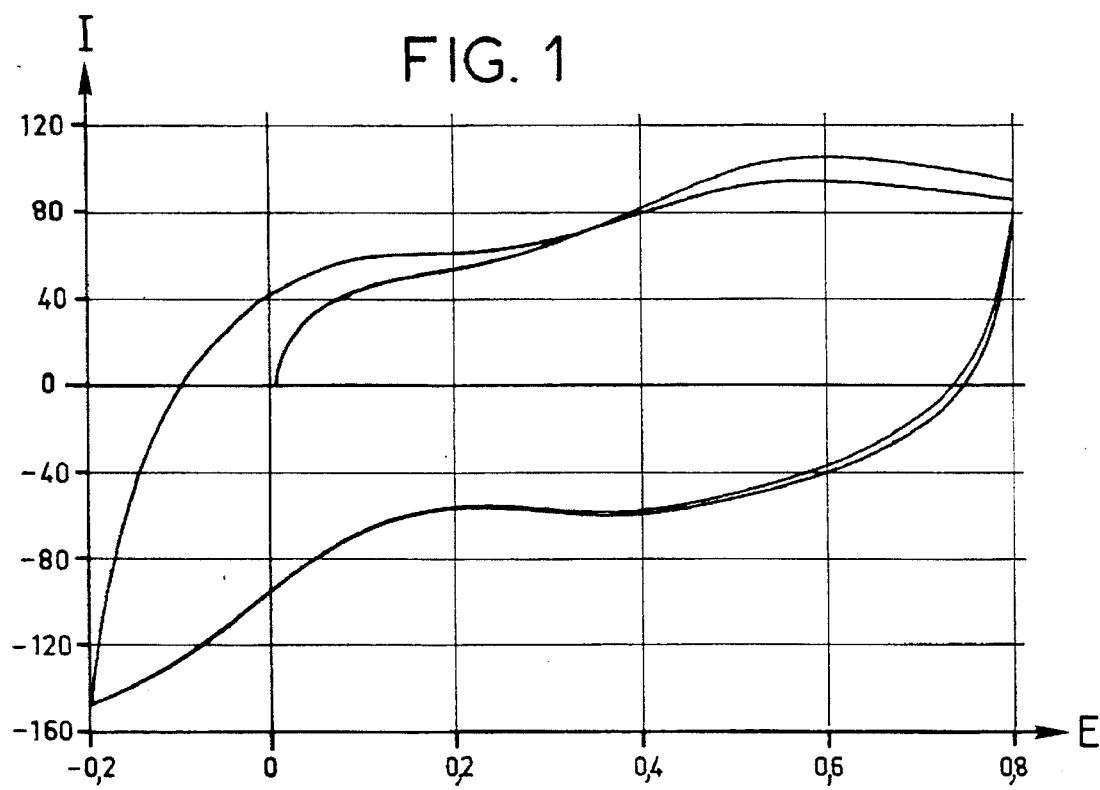
FIG. 1 shows the spectrum of cyclical volt-amp measurements performed on a prior art electrode.
Figure 2:
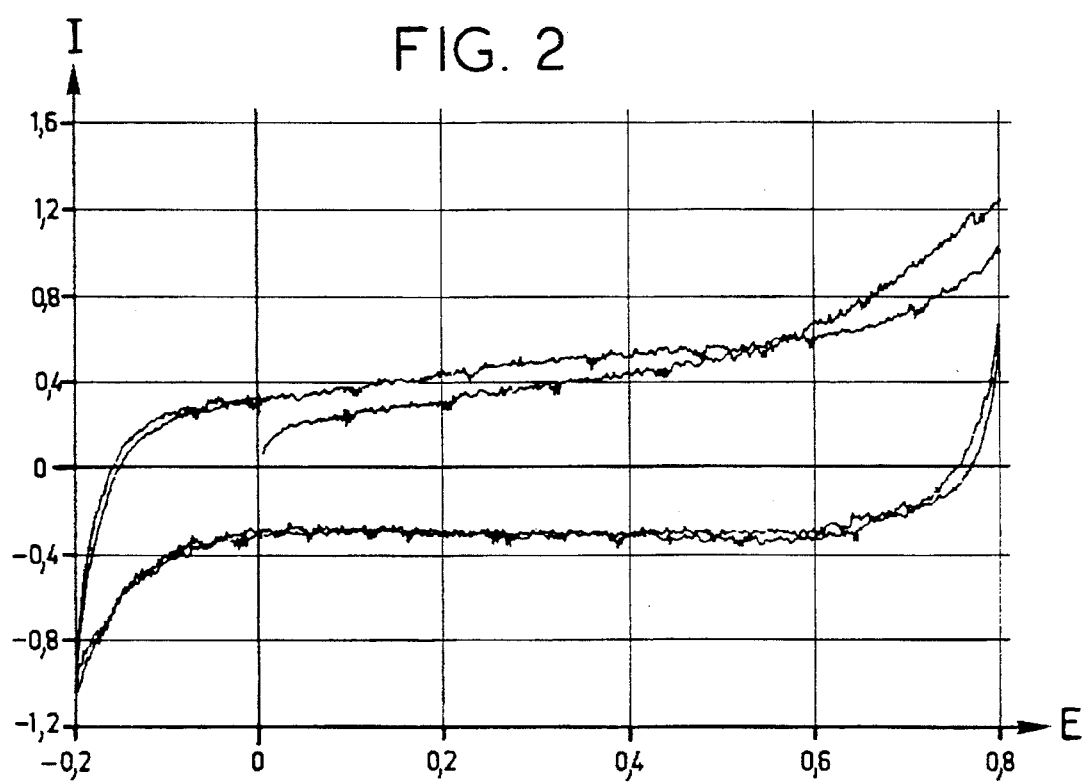
FIG. 2 shows an analogous spectrum for an electrode of the present invention.

In FIGS. 1 and 2, current I is plotted up the ordinate in mA, and potential E is plotted along the abscissa in V relative to a calomel reference electrode.

EXAMPLE 1

Prior art 1 g of hydrated ruthenium chloride $RuCl_3 xH_2O$ was dissolved in a medium heated to 50° C. and containing 2 g of 20% HCl solution. Complete-drying for 24 hours in an oven at 60° C. enabled a solid compound to be recovered that was soluble in isopropanol.

A viscous paste was made using isopropanol and was deposited on a titanium support that had previously been raised to 100° C. Drying was performed for 30 minutes at 150° C. in air after predrying for 40 minutes at 50° C. Thereafter the dried ruthenium chloride was decomposed in air at 300° C. for 2 hours. A fine layer of ruthenium oxide $RuO_2$ was then obtained on the support.

The operation of depositing and applying heat treatment to ruthenium chloride was repeated several times in order to form a thick layer of ruthenium oxide on the titanium support, which layer was finally treated at 315° C. in air for 2 hours to finish off oxidation.

The electrode was tested by cyclical volt-amp measurement in a sulfuric acid medium (5N $H_2SO_4$, d=1.25) with a scanning speed of 10 mV/s. The capacitance density as measured using a current of 123 mA was 59.3 Farads per gram of electrode. The electroactive domain of the active material was 0.69 V (FIG. 1).

EXAMPLE 2

1 g of hydrated ruthenium chloride $RuCl_3$, $xH_2O$ was dissolved in 30 cm$^3$ of a 1N solution of caustic soda NaOH. Excess ethyl alcohol was then added, thereby causing ruthenium hydroxide $Ru(OH)_4$ to be precipitated in very fine grains.

The precipitate was then extracted by centrifuging and subsequently redispersed in ethanol. That operation was repeated several times over until the silver nitrate test indicated that the ion Cl⁻ was not present. The precipitate was then washed in ether, recovered by centrifuging, and dried in a vacuum at 70° C. for 17 hours.

1 g of active carbon was then mixed with 258.6 mg of ruthenium hydroxide $Ru(OH)_4$ which was dispersed in a solution comprising 50% ethanol and 50% terpineol. The resulting thick liquid was homogenized for 1 hour in a ball mill, and then centrifuged. The resulting solid compound was washed successively in ethanol and in ether as described above, and then dried for 17 hours at 70° C.

The powder mixture was then treated in a vacuum at 300° C. for 24 hours. Electrode active material was obtained containing 20% ruthenium oxide $RuO_2$. 8% of an emulsion of polytetrafluoroethylene (PTFE) was added to some of the previously prepared active material, and an electrode was made having a thickness of 0.52 mm and weighing 18.1 mg.

The electrode was tested by cyclical volt-amp measurement in a sulfuric acid medium (5N $H_2SO_4$, d=1.25) at a scanning speed of 0.1 mV/s. The capacitance measured at a current of 0.78 mA was 3.9 Farads, giving a capacitance density of 215.47 Farads per gram of electrode. The electroactive domain of the active material was 0.69 V (FIG. 2).

The present invention is naturally not limited to the embodiments described, and numerous variants thereof are accessible to the person skilled in the art without going beyond the spirit of the invention.

We claim:

1. A method of manufacturing a supercapacitor electrode containing a metal oxide and carbon-containing material, the method including the following steps:

starting from a salt of said metal dissolved in an aqueous solution of a base, the hydroxide of said metal is precipitated in the form of a gel by adding an alcohol;

said precipitate of the hydroxide of said metal is washed and dried;

active carbon is added to said precipitated hydroxide of said metal to constitute a first mixture;

said first mixture is subjected to heat treatment in order to transform the hydroxide into an oxide, and a mixture of metal oxide and of active carbon is obtained which constitutes the active material of the electrode; and a binder is added to said active material to form a paste which is put into the form of an electrode.

2. A method according to claim 1, in which said metal is selected from: ruthenium, iridium, tungsten, molybdenum, cobalt, chromium, manganese, nickel, and mixtures thereof.

3. A method according to claim 1, in which said metal salt is selected from a salt of a acid and a salt of oxalic acid.

4. A method according to claim 1, in which said alcohol is selected from ethanol, methanol, isopropanol, butanol, and mixtures thereof.

5. A method according to claim 1, in which said the treatment is performed at a temperature lying in the range 200° C. to 300° C.

6. A method according to claim 1, wherein said base is a strong base.

7. A method according to claim 1, wherein said base is selected from the group consisting of NaOH and KOH.

8. A method according to claim 3, wherein said acid is a strong acid.

9. A method according to claim 3, wherein said acid is selected from the group consisting of a chloride, a sulfate and a nitrate.

* * * * *